(12) United States Patent
Bourdelais et al.

(10) Patent No.: US 7,122,235 B2
(45) Date of Patent: Oct. 17, 2006

(54) TACK FREE CAUTERIZED EDGE FOR PRESSURE SENSITIVE ADHESIVE WEB

(75) Inventors: Robert P. Bourdelais, Pittsford, NY (US); John J. Seyna, Williamson, NY (US); John M. Palmeri, Hamlin, NY (US); Robert G. Spencer, Rochester, NY (US); Wayne K. Shaffer, Penfield, NY (US); David C. Press, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/878,853

(22) Filed: Jun. 11, 2001

(65) Prior Publication Data

US 2003/0059563 A1    Mar. 27, 2003

(51) Int. Cl.
  *B32B 9/00*   (2006.01)
  *B32B 3/14*   (2006.01)
  *B32B 23/02*  (2006.01)
  *G03C 3/00*   (2006.01)

(52) U.S. Cl. .................. 428/40.1; 428/77; 428/192; 428/202; 428/220; 430/11; 430/12

(58) Field of Classification Search ...... 428/40.1–42.3, 428/77, 192, 220, 115, 78, 202, 209, 211, 428/213–216, 79; 430/12, 11, 256; 40/741, 40/761
See application file for complete search history.

(56) References Cited

U.S. PATENT DOCUMENTS

| | | | |
|---|---|---|---|
| 4,414,051 A | 11/1983 | Bose | |
| 4,447,482 A * | 5/1984 | Heinzelman et al. | 428/42.3 |
| 4,490,203 A | 12/1984 | Bose | |
| 5,314,767 A | 5/1994 | Bussard | |
| 5,364,671 A * | 11/1994 | Gustafson | 428/14 |
| 5,365,821 A | 11/1994 | Munier et al. | |
| 5,455,129 A | 10/1995 | Bussard | |
| 5,500,503 A | 3/1996 | Pernicka et al. | |
| 5,502,292 A | 3/1996 | Pernicka et al. | |
| 5,611,949 A | 3/1997 | Snellman et al. | |
| 5,616,387 A * | 4/1997 | Augst et al. | 428/43 |
| 5,630,308 A | 5/1997 | Guckenberger | |
| 5,679,119 A | 10/1997 | Freeman et al. | |
| 5,700,535 A * | 12/1997 | Galsterer et al. | 428/40.1 |
| 5,736,210 A * | 4/1998 | Treleaven | 428/40.1 |
| 5,866,282 A | 2/1999 | Bourdelais et al. | |
| 5,888,714 A | 3/1999 | Bourdelais et al. | |

(Continued)

FOREIGN PATENT DOCUMENTS

EP    0 737 552    10/1996

(Continued)

OTHER PUBLICATIONS

Websters II New Riverside University Dictionary, The Riverside Publishing Co.:Boston, 1984, p. 240.*

(Continued)

*Primary Examiner*—Harold Pyon
*Assistant Examiner*—Patricia L Nordmeyer
(74) *Attorney, Agent, or Firm*—Paul A. Leipold (57) ABSTRACT

The invention relates to a web material comprising a carrier sheet, a continuous pragmatic sheet and an adhesive layer wherein the adhesive layer is between the carrier sheet and the pragmatic sheet, the adhesive layer more strongly adheres to the pragmatic sheet and the pragmatic sheet is narrower than the carrier sheet wherein the side of the carrier sheet in contact with the adhesive is reflective.

33 Claims, 2 Drawing Sheets

U.S. PATENT DOCUMENTS

| | | | |
|---|---|---|---|
| 5,955,239 A | 9/1999 | Haydock et al. | 430/212 |
| 5,965,304 A * | 10/1999 | Yau et al. | 430/11 |
| 5,974,922 A | 11/1999 | Camp et al. | |
| 5,985,075 A | 11/1999 | Freedman | |
| 6,045,965 A * | 4/2000 | Cournoyer | 430/263 |
| 6,103,050 A | 8/2000 | Krueger | |
| 6,110,552 A | 8/2000 | Casey et al. | |
| 6,130,024 A * | 10/2000 | Aylward et al. | 430/256 |
| 6,191,382 B1 | 2/2001 | Damikolas | |
| 6,228,449 B1 * | 5/2001 | Meyer | 428/40.1 |
| 6,355,322 B1 * | 3/2002 | Golledge | 428/40.1 |
| 6,416,835 B1 * | 7/2002 | Preston et al. | 428/40.1 |
| 2002/0088574 A1 * | 7/2002 | Seltzer et al. | 162/72 |

FOREIGN PATENT DOCUMENTS

| | | | |
|---|---|---|---|
| JP | 57-157786 | * | 9/1982 |
| JP | 07-258615 | * | 10/1995 |
| WO | WO 82/01516 | * | 5/1982 |

OTHER PUBLICATIONS

Spielekiste: "Einmaliges Photoalbum", www.Spielekiste.De, Online 2000.

Japanese Patent Abstract No. 05249615.

* cited by examiner

TACK FREE CAUTERIZED EDGE FOR PRESSURE SENSITIVE ADHESIVE WEB

FIELD OF THE INVENTION

The invention relates to pressure sensitive adhesive materials. In a preferred form it relates to the use of silver halide pressure sensitive label for the printing of text, graphics and images applied to packaging material.

BACKGROUND OF THE INVENTION

Pressure sensitive labels applied are applied to packages to build brand awareness, show the contents of the package, convey a quality message regarding the contents of a package and supply consumer information such as directions on product use, or an ingredient listing of the contents. Printing on the pressure sensitive label is typically applied directly to the package or a printed media, typically printed using gravure printing or flexography is applied to the package. The three types of information are typically applied to a pressure sensitive label are text, graphic and images. Prior art printed labels are typically die cut to remove pragmatic sheet and pressure sensitive adhesive in the areas that are not imaged. Rolls of imaged, die cut labels, which are free from adhesive at the edges, are provided to packing labeling operations. While the die cut imaged prior art labels are free from adhesive at the edges, the labels are also cut in the cross direction yielding a roll of discrete imaged labels.

Photographic materials have been known for use as prints for preserving memories for special events such as birthdays and vacations. They also have been utilized for large display materials utilized in advertising. These materials have been known as high quality products that are costly and somewhat delicate as they would be easily defaced by abrasion, water, or bending. Photographs are traditionally placed in frames, photo albums, and behind protective materials in view of their fragile and delicate nature, as well as their value. They are considered luxury items for the consumers to preserve a record of important events in their lives. They also have been considered as expensive display materials for advertising. In view of their status as luxury items, they have not been utilized in other areas of commerce.

Typically pressure sensitive labels are supplied with a carrier web material that allows the pressure sensitive label to be transported though the printing process and converting process while protecting the adhesive. Prior art carrier materials typically comprise a coated paper or a thin polymer carrier on to which a release coating is subsequently provided. Carrier materials typically utilized in the pressure sensitive label are not suitable for a photographic label. Problems such as photographic reactivity with the light sensitive layers, lack of stiffness of the carrier and edge penetration of processing chemistry into the paper used as a carrier prevent typical polymer and paper carriers from being utilized for photographic pressure sensitive labels.

Prior art ink printed labels that are applied to packages consist of a pragmatic sheet material, a pressure sensitive adhesive and a carrier. The label substrate consisting of the pragmatic sheet, pressure sensitive adhesive and carrier are typically laminated and then printed utilizing a variety of non photographic printing methods. After printing, the labels are generally protected by an over laminate material or a protective coating. The completed label consisting of a protection layer, printed information, pragmatic sheet, pressure sensitive adhesive and carrier material is applied to packages utilizing high speed labeling equipment. During the conversion of pressure sensitive web materials into labels, the pressure sensitive web materials consisting of a pragmatic sheet, carrier, pressure sensitive and release coating are printed in equipment that is center guided, that is the label web materials do not contact machine frames, guides or spacers. Repeated edge contact of pressure sensitive web materials against machine guides, for example, would likely result in adhesive transfer from the pressure sensitive web to the machine guide resulting in unwanted adhesive build up on the edge guide.

In order for light sensitive silver halide imaging layers to be utilized for pressure sensitive labels, the exposed pressure sensitive adhesive at the edges of light sensitive silver halide web materials must be significantly reduced so that the transfer of pressure sensitive adhesive to edge guide equipment typically found in photographic printers is eliminated. The transfer of pressure sensitive adhesive to edge guided photographic printers results in loss of printing efficiency, printing defects and web fracture.

During the manufacturing of color paper it is necessary to cut the material lengthwise prior to its exposure, to reach suitable size for customer use. The photographic paper is formed in long, wide sheets, then spooled into large rolls. These rolls must be slit to suitable widths in a very accurate manner. It is important that the slitting be performed without damage to the sensitive photographic materials that are on the paper substrate. Further, it is important that slitting be performed without creation of substantial dust which might lead to undesirable contamination of picture surfaces after development.

Generally the knives utilized for cutting photographic papers have been arrangements of circular knives on shafts, with the paper being fed between the shafts with knives. The circular knives are brought together such that they touch and overlap slightly at the edge. It is common for one knife to have a square edge called the female knife, and the other knife to be ground at some angle, this knife called a male knife. In this way, many strips can be simultaneously slit from a wide sheet. U.S. Pat. No. 5,365,821—Munier et al discloses such a cutting device. EP 0 737 552—Blandin also discloses a knife and anvil cutting device. U.S. Pat. No. 5,974,922 Camp et al discloses knife geometry to provide acceptable slit edge for photographic color paper. It has been found that shear slitting of a web material containing a pressure sensitive adhesive produces a slit roll that is tacky and prone to adhesive transfer during edge guiding.

There are also known in the art methods for slitting and sealing two or more materials using light beams from a laser instead of heated knives. Because light beams generated by lasers are more precise energy transfer devices than heated knives, laser-based methods typically result in cleaner seals where fusing is involved. One example of a laser slitting and sealing method is found in U.S. Pat. Nos. 4,414,051 and 4,490,203 (Bose et al), disclosing a method whereby a laser beam slits and seals an extrusion blown tube into two or more tubes. The Bose patents focus on reduced bead formation at slit/seal points and improved seal strength. Other laser slitting and sealing methods include: U.S. Pat. No. 5,630,308 (Guckenberger et al), disclosing a method of laser scoring packaging substrates to form an easy opening tear control package such as a pouch; U.S. Pat. Nos. 5,502,292 and 5,500,503 (Pernicka et al.), disclosing a method of simultaneously cutting and welding ultra thin metallic foil materials using a pulsed laser; and U.S. Pat. Nos. 5,314,767 and 5,455,129 to Bussard, disclosing a holographic product having sealed edges. In Bussard, a plastic top layer of the holographic product can be simultaneously cut and sealed with a variety of cutting tools including a laser. In U.S. Pat. No. 6,103,050 (Krueger) a method of laser slitting and sealing two polymeric sheets is proposed. In U.S. Pat. No. 6,103,050 the sealing of the two sheets would counter productive to providing a pragmatic sheet that can be removed from a carrier sheet.

PROBLEM TO BE SOLVED BY THE INVENTION

There is a need for pressure sensitive labels for application to packages that are high in quality and at the same time economical for short runs. There is a further need for providing photographic label web materials that are tack free at the edges.

SUMMARY OF THE INVENTION

It is an object of the invention to provide higher quality images to packaging materials.

It is a further object to provide a silver halide imaging system labels that have bright and sharp images.

It is another object to provide photographic web materials that are tack free at the edges.

It is a further object to provide web materials that have cauterized pressure sensitive adhesive at the slit edge.

These and other objects of the invention are accomplished by a web material comprising a carrier sheet, a continuous pragmatic sheet and an adhesive layer wherein said adhesive layer is between said carrier sheet and said pragmatic sheet, said adhesive layer more strongly adheres to said pragmatic sheet and said pragmatic sheet is narrower than said carrier sheet wherein the side of said carrier sheet in contact with said adhesive is reflective.

ADVANTAGEOUS EFFECT OF THE INVENTION

The invention provides improved image quality for packaging materials. The invention includes a printing method that can print text, graphic and images using negative working optical systems or optical digital printing systems that are edge guided for the formation of a silver halide pressure sensitive label for packaging.

DETAILED DESCRIPTION OF THE INVENTION

The invention has numerous advantages over prior practices in the art. Recently there has been a trend in the marketing of mass consumer items to try to localize the marketing to separately approach smaller groups. These groups may be regional, ethnic, gender, age, or special interest differentiated. In order to approach these different groups, there is a need to provide packaging that is specifically directed to these groups. As discussed above, the traditional packaging materials are generally suited for very long runs of material and to form shorter runs or to provide rapid changes in packaging is impossible or very expensive. We have found silver halide based photographic materials that are suitable for packaging uses. Further, recently there has become available rapid photo processing apparatus suitable for short runs of material. There is also available silver halide processing apparatus that is capable of high speed relatively long continuous runs of material. The combination of low cost packaging suitable photographic material with the processing apparatus available for rapid short and long runs of material has resulted in the opportunity for silver halide material to be utilized in packaging materials. Silver halide materials that have properties such as flexibility, low cost, and the ability to flex and bend has resulted in materials satisfactory and suitable for packaging.

The utilization of the thin, flexible, and tough silver halide materials results in a packaging material having many superior properties. These materials are capable of having brighter, sharper, and higher color images that anything presently available in packaging. The packaging materials of the invention have a depth of image unsurpassed by existing packaging materials. The packaging materials of the invention may provide a variety of packing materials that are suitable for pressure sensitive labeling of packages such as shampoo bottles, perfume bottles and film boxes. The packaging materials of the invention while having the advantage of superior image are available on thin base materials which are low in cost while providing superior opacity and strength. The packaging materials of the invention as they may be imaged by flash optical exposure or digital printing have the ability to be formed in short runs and to be rapidly switched from one image to the next without delay.

The silver halide label material of the invention is provided with a tack free edge that can be efficiently transported through in a digital or optical printer that contains edge guiding equipment as prior web materials containing pressure sensitive adhesive have been shown to transfer unwanted pressure sensitive adhesive into the high speed, clean, high precision photographic printing equipment. Unwanted transfer of pressure sensitive adhesive as been shown to result in web fracture, loss of machine efficiency because of frequent cleanings and blocking of rolls as accumulated adhesive transfers to the web in the machine and the web is subsequently wound into rolls. Blocking means the rolls do not unroll. Prior art label web materials are typically shear slit and contain adhesive at the slit edge and therefore can not be efficiently transported through edge guided equipment. Further, the invention cauterizes the incorporated pressure sensitive adhesive at the slit edge, further reducing adhesive transfer during edge guiding.

The invention also provides a method for producing web materials that are tack free without the expensive need for high precision knife equipment. The invention allows for the tack free edge to be manufactured without concern for the carrier sheet thickness and thickness variability within a manufacturing population.

Because the edges of the invention web material are tack free, the invention allows for the use of existing photographic printing equipment and processing equipment as much of the existing installed base of equipment is not center guided. The use of current photographic printing equipment and processing equipment also allows the web material of the invention to be used as a photographic sticker print without the need for new expensive equipment to be designed and built. The tack free edges of the invention also allow the web material of the invention to be used in ink jet printers, thermal dye transfer printers and electrophotographic printers as adhesive transfer from the slit edges remains a problems in many types of equipment. The tack free edge of the web material further allows for easy consumer separation of the pragmatic sheet from the carrier sheet as the carrier sheet is exposed at the edges of the web.

The cauterized adhesive layer reduces the adhesive transfer from the pragmatic side of the web to the carrier sheet side of the web as the web material is wound and stored in roll form. Further, the cauterized adhesive layer has been shown to reduce harmful interaction with the wet chemical processing required for developing a silver halide image. The reduced sensitivity to process chemistry allows for a greater number of adhesive formulations to be utilized with silver halide imaging layers.

The silver halide label materials of the invention allow packages to be rapidly designed and brought to market. For instance, significant events in sports or entertainment may be practically instantly brought to market as a digital image may be immediately flash exposed onto silver halide pressure sensitive labels and utilized within moments from the time of the event. This is in contrast to typical photogravure or flexographic imaging where lead times for pressure sensitive labels are typically several weeks. Further, the quality of the silver halide formed image lends itself to collectable images formed as a part of packaging much better than previous images which were of lower quality and were less desirable for collecting. Finally, the regional customization of images is rapidly possible.

The ability to rapidly change packaging also would find use in the need to provide regional labeling with different languages and marketing themes in different countries. Further, different countries have different legal labeling requirements as to content. For instance, alcoholic beverages such as wine and beer are subject to a wide variety of regional and national variations in labeling requirements. Wines manufactured in France may have long delays in shipping out of France due to the wait for national labeling in other countries. Photographic images also would be particularly desirable for a premium products such as fine wines, perfumes, and chocolates, as they would be of high quality and reflect the high quality of the product in the package.

The invention provides a printing method that is economically viable when printing short runs as the cost of printing plates or printing cylinders are avoided. The use of silver halide images applied to a package ensures the highest image quality currently available compared to the common but lower quality six color rotogravure printed images. Further, because the yellow, magenta, and cyan layers contain gelatin interlayers, the silver halide images appear to have depth compared to ink jet or electrophotographic images which appear flat and lifeless. Silver halide image layers have also been optimized to accurately replicate flesh tones, providing superior images of people compared to alternate prior art digital imaging technologies. These and other advantages will be apparent from the detailed description below.

The terms as used herein, "top", "upper", "emulsion side", and "face" mean the side or toward the side of a packaging label bearing the imaging layers. The term environmental protection layer means the layer applied to the post processed imaging layers. The terms "facestock" and "pragmatic sheet" mean the material to which the imaging layers are applied. The terms "bottom", "lower side", "carrier sheet", "carrier" and "back" mean the side or toward the side of the image label or photographic label packaging material opposite from the side bearing the photosensitive imaging layers or developed image.

In order to produce a pressure sensitive photographic label, the web material must allow for efficient transport in manufacturing, image printing, image development, label converting and label application equipment. Because typical photographic printers and processors are edge guided, the web material must be tack free at the edges to prevent unwanted adhesive transfer to the machine components and the web. A web material having a tack free edge is preferred as the web material can be transported without unwanted adhesive transfer to machine components. For a web material consisting of a carrier sheet, a continuous pragmatic sheet and an adhesive layer where the adhesive layer is between the carrier sheet and the continuous pragmatic sheet a pragmatic sheet that is narrower than the carrier sheet is preferred. By providing a narrower pragmatic sheet the adhesive, being adhered to the pragmatic sheet is not located at the edges of the slit roll and thus provides a tack free web material that can be printed and processed in equipment that contains edge guiding equipment.

Figure 1:
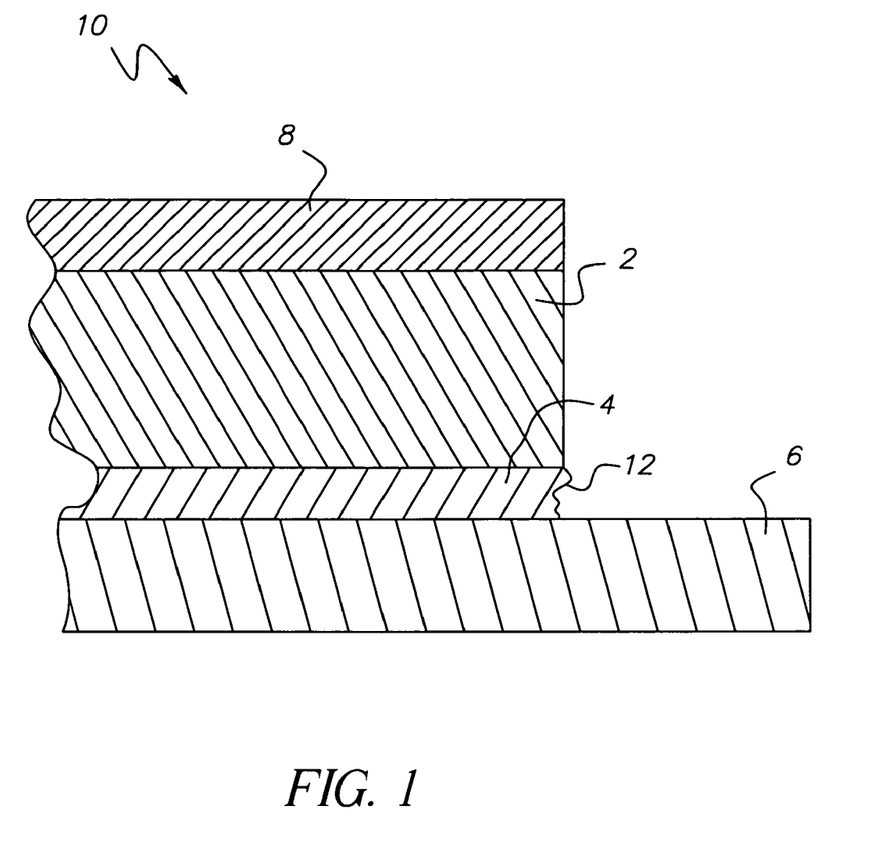
FIG. 1 is an illustration of the structure of a tack free imaging web material with a cauterized adhesive.

FIG. 1 is an illustration of a cross section structure of a tack free imaging web material that was pre-slit with a laser. Tack free web material 10 consists of imaging layer 8, pragmatic sheet 2, adhesive layer 4 and carrier sheet 6. Carrier sheet 6 width is greater than the pragmatic sheet 2 and thus adhesive layer 4 has been located away from the edge of the roll. Cauterized pressure sensitive adhesive 12 is slightly indented from pragmatic sheet 2 and has been shown to be less tacky than adhesive that has not been cut with a laser. When imaging web material 10 is wound into a roll, imaging layer 8 contacts carrier sheet 6 and adhesive layer 4 is located away from the edge of the roll creating a tack free roll. When imaging web material 10 is transported in an edge guided printing device, carrier sheet 6 is in contact with the edge guided device.

Slitting of the pragmatic sheet and the adhesive is preferably accomplished with lasers. Because the primary slitting of the pragmatic sheet and the adhesive is accomplished with a laser, it has been shown that the laser energy cauterizes the adhesive during the primary cut of the pragmatic sheet and the adhesive. The cauterized adhesive has been shown to be less likely to transfer to printing equipment and less likely to transfer to the web of the invention when the invention web is wound into a roll. A carrier sheet that is reflective is preferred as the energy of the laser is best utilized when the energy is reflected back toward the slit. It has been shown that clear carrier sheets and black carrier sheets do not provide enough reflection of the laser energy for an efficient cut of the pragmatic sheet and the pressure sensitive adhesive. Further, a clear carrier allows laser energy to be scattered from machine components and has been shown to "expose" the light sensitive layers of the imaging layers.

A continuous pragmatic sheet, that is a sheet that is at least 10 meters in length, is preferred because the intent of the invention is a pragmatic web material that needs to be in a continuous state for further transformations such as printing. If in the case of label the pragmatic sheet was not continuous, then the pragmatic sheet would become less effective as it could not be die cut in label converting operations. Further, in the case of pragmatic sheet and carrier for use in other labels, the consumer may select a length and use a cut off device to separate a desired amount of material. A non continuous pragmatic sheet could not yield a "roll" of wound adhesive layered pragmatic sheet.

The pragmatic web centered on the carrier sheet is preferred as this configuration allows for efficient winding of the web material. Further, by centering the pragmatic web on the carrier sheet, the use of the web material is not constrained by the winding direction. The carrier sheet that is between 0.6 and 10 mm wider than the pragmatic sheet is preferred. A carrier sheet that is less than 0.5 mm wider is difficult to slit and remove as the tensile strength of the pragmatic sheet is not sufficient for tension winding. A carrier sheet that is 12 mm wider than the pragmatic sheet is not economical as a significant portion of the pragmatic web is discarded. Further, it has been shown that a 12 mm wider carrier sheet does not have sufficient bending resistance to withstand edge guidance in photographic printers and processors.

In another embodiment of the invention, the carrier sheet is not centered on the pragmatic sheet. In this embodiment of the invention, the carrier sheet has the adhesive removed on one edge only. This allows for less pragmatic sheet to be removed and thus is cost effective. If the edge guidance equipment only contacts one side of the web, then a carrier sheet not centered on the pragmatic sheet is preferred.

A peelable carrier sheet or back is preferred as the pressure sensitive adhesive required for adhesion of the label to the package, can not be transported through labeling equipment without the carrier sheet. The carrier sheet provides strength for conveyance and protects the pressure sensitive adhesive prior to application to the package. A preferred carrier sheet material is cellulose paper. A cellulose paper carrier sheet is flexible, strong and low in cost compared to polymer substrates. Further, a cellulose paper substrate allows for a textured label surface that can be desirable in some packaging applications. The label retains the texture even after removal of the carrier. The paper may be provided with coatings that will provide waterproofing to the paper as the photographic element of the invention must be processed in aqueous chemistry to develop the image. Examples of suitable water proof coatings applied to the paper are acrylic polymer, melt extruded polyethylene and oriented polyolefin sheets laminated to the paper. Paper is also preferred as paper can contain moisture and salt which provide antistatic properties that prevent static sensitization of the silver halide image layers.

Further, paper containing sizing agents, known in the photographic paper art and disclosed in U.S. Pat. No. 6,093,521, provide resistance to edge penetration of the silver halide image processing chemistry. An edge penetration of less than 8 mm is preferred as processing chemistry penetrated into the paper greater than 12 mm has been shown to swell causing die cutting problems when pragmatic sheet matrix is die cut and stripped from the carrier sheet. Also, penetration of processing chemistry greater than 12 mm increases the chemistry usage in processing resulting in a higher processing costs.

Another preferred carrier sheet material or peelable back is an oriented sheet of polymer. The carrier sheet preferably is an oriented polymer because of the strength and toughness developed in the orientation process. Preferred polymers for the carrier sheet substrate include polyolefins, polyester and nylon. Preferred polyolefin polymers include polypropylene, polyethylene, polymethylpentene, polystyrene, polybutylene, and mixtures thereof. Polyolefin copolymers, including copolymers of propylene and ethylene such as hexene, butene, and octene are also useful. Polyester is most preferred, as it is has desirable strength and toughness properties required for efficient transport of silver halide pressure sensitive label carrier sheet in high speed labeling equipment. The oriented polymer carrier sheet may have a voided layer.

In another preferred embodiment, the carrier sheet consists of a paper core to which sheets of oriented polymer are laminated. The laminated paper carrier sheet is preferred because the oriented sheets of polymer provide tensile strength which allows the thickness of the carrier sheet to be reduced compared to coated paper and the oriented polymer sheet provides resistance to curl during manufacturing and drying in the silver halide process.

The tensile strength of the carrier sheet or the tensile stress at which a substrate breaks apart is an important conveyance and forming parameter. Tensile strength is measured by ASTM D882 procedure. A tensile strength greater than 120 MPa is preferred as carrier sheets less than 110 MPa begin to fracture in automated packaging equipment during conveyance, forming and application to the package.

The coefficient of friction or COF of the carrier sheet containing the silver halide imaging layer is an important characteristic as the COF is related to conveyance and forming efficiency in automated labeling equipment. COF is the ratio of the weight of an item moving on a surface to the force that maintains contact between the surface and the item. The mathematical expression for COF is as follows:

$$COF = \mu = (\text{friction force/normal force})$$

The COF of the carrier sheet is measured using ASTM D-1894 utilizing a stainless steel sled to measure both the static and dynamic COF of the carrier sheet. The preferred COF for the carrier sheet of the invention is between 0.2 and 0.6. As an example, a 0.2 COF is necessary for coating on a label used in a pick-and-place application. The operation using a mechanical device to pick a label and move it to another point requires a low COF so the label will easily slide over the surface of the label below it. At the other extreme, large sheets such as book covers require a 0.6 COF to prevent them from slipping and sliding when they are piled on top of each other in storage. Occasionally, a particular material may require a high COF on one side and a low COF on the other side. Normally, the base material itself, such as a plastic film, foil, or paper substrate, would provide the necessary COF for one side. Application of an appropriate coating would modify the image side to give the higher or lower value. Conceivably, two different coatings could be used with one on either side. COF can be static or kinetic. The coefficient of static friction is the value at the time movement between the two surfaces is ready to start but no actual movement has occurred. The coefficient of kinetic friction refers to the case when the two surfaces are actually sliding against each other at a constant rate of speed. COF is usually measured by using a sled placed on the surface. The force necessary at the onset of sliding provides a measurement of static COF. Pulling the sled at a constant speed over a given length provides a measure of kinetic frictional force.

The preferred thickness of the carrier sheet of the invention is between 75 and 225 micrometers. Thickness of the carrier sheet is important in that the strength of the carrier sheet, expressed in terms of tensile strength or mechanical modulus, must be balanced with the thickness of the carrier sheet to achieve a cost efficient design. For example, thick carrier sheets that are high in strength are not cost efficient because thick carrier sheets will result in short roll lengths compared to thin carrier sheets at a given roll diameter. A carrier sheet thickness less that 60 micrometers has been shown to cause transport failure in the edge guided silver halide printers. A carrier sheet thickness greater than 250 micrometers yields a design that is not cost effective and is difficult to transport in existing silver halide printers.

The carrier sheet of the invention preferably has an optical transmission of less than 20%. During the printing of the silver halide labels, exposure light energy is required to reflect from the pragmatic sheet/carrier sheet combination to yield a secondary exposure. This secondary exposure is critical to maintaining a high level of printing productivity. It has been shown that carrier sheets with an optical transmission of greater than 25% significantly reduces the printing speed of the silver halide label. Further, clear pragmatic sheet material to provide the "no label look" needs an opaque carrier sheet to not only maintain printing speed, but to prevent unwanted reflection from printing platens in current silver halide printers.

Since the light sensitive silver halide layers of the invention can suffer from unwanted exposure from static discharge during manufacturing, printing and processing, the line preferably has a resistivity of less than $10^{11}$ ohms/square. A wide variety of electrically-conductive materials can be incorporated into antistatic layers to produce a wide range of conductivities. These can be divided into two broad groups: (i) ionic conductors and (ii) electronic conductors. In ionic conductors charge is transferred by the bulk diffusion of charged species through an electrolyte. Here the resistivity of the antistatic layer is dependent on temperature and humidity. Antistatic layers containing simple inorganic salts, alkali metal salts of surfactants, ionic conductive polymers, polymeric electrolytes containing alkali metal salts, and colloidal metal oxide sols (stabilized by metal salts), described previously in patent literature, fall in this category. However, many of the inorganic salts, polymeric electrolytes, and low molecular weight surfactants used are water-soluble and are leached out of the antistatic layers during processing, resulting in a loss of antistatic function. The conductivity of antistatic layers employing an electronic conductor depends on electronic mobility rather than ionic mobility and is independent of humidity. Antistatic layers which contain conjugated polymers, semiconductive metal halide salts, semiconductive metal oxide particles, etc. have been described previously. However, these antistatic layers typically contain a high volume percentage of electronically conducting materials which are often expensive and impart unfavorable physical characteristics, such as color, increased brittleness, and poor adhesion to the antistatic layer.

In a preferred embodiment of this invention the label has an antistat material incorporated into the carrier sheet or coated on the carrier sheet. It is desirable to have an antistat that has an electrical surface resistivity of at least $10^{11}$ log ohms/square. In the most preferred embodiment, the antistat material comprises at least one material selected from the group consisting of tin oxide and vanadium pentoxide.

In another preferred embodiment of the invention antistatic material are incorporated into the pressure sensitive adhesive layers. The antistatic material incorporated into the pressure sensitive adhesive layer provides static protection to the silver halide layers and reduces the static on the label which has been shown to aid labeling of containers in high speed labeling equipment. As a stand-alone or supplement to the carrier sheet comprising an antistatic layer, the pressure sensitive adhesive may also further comprise an antistatic agent selected from the group consisting of conductive metal oxides, carbon particles, and synthetic smectite clay, or multilayered with an inherently conductive polymer. In one of the preferred embodiments, the antistat material is metal oxides. Metal oxides are preferred because they are readily dispersed in the thermoplastic adhesive and can be applied to the polymer sheet by any means known in the art. Conductive metal oxides that may be useful in this invention are selected from the group consisting of conductive particles including doped-metal oxides, metal oxides containing oxygen deficiencies, metal antimonates, conductive nitrides, carbides, or borides, for example, $TiO_2$, $SnO_2$, $Al_2O_3$, $ZrO_3$, $In_2O_3$, $MgO$, $ZnSb_2O_6$, $InSbO_4$, $TiB_2$, $ZrB_2$, $NbB_2$, $TaB_2$, $CrB_2$, $MoB$, $WB$, $LaB_6$, $ZrN$, $TiN$, $TiC$, and $WC$. The most preferred materials are tin oxide and vanadium pentoxide because they provide excellent conductivity and are transparent.

In order to provide a digital printing technology that can be applied to a package that is high in quality, can handle text, graphic and images, is economical for short run printing jobs and accurately reproduce flesh tones, silver halide imaging is preferred. The silver halide technology can be either black and white or color. The silver halide imaging layers are preferably exposed and developed prior to application to a package. The flexible substrate of the invention contains the necessary tensile strength properties and coefficient of friction properties to allow for efficient transport and application of the images in high speed labeling equipment. The substrate of the invention is formed by applying light sensitive silver halide imaging layers of a flexible label stock that contains a pressure sensitive adhesive. The imaging layers, pragmatic sheet and pressure sensitive adhesive are supported and transported through labeling equipment using a tough carrier sheet material. Because the light sensitive silver halide imaging layers are vulnerable to environmental solvents such as water, coffee and hand oils, an environmental protection layer is preferably applied to the light sensitive silver halide imaging layers after image development.

The pragmatic sheet material, or the flexible substrate utilized in this invention on to which the light sensitive silver halide imaging layers are applied, must not interfere with the silver halide imaging layers. Further, the pragmatic sheet material of this invention needs to optimize the performance of the silver halide imaging system. Suitable flexible substrates must also perform efficiently in a automated packaging equipment for the application of labels to various containers. A preferred flexible substrate is cellulose paper. A cellulose paper substrate is flexible, strong and low in cost compared to polymer substrates. Further, a cellulose paper substrate allows for a textured label surface that can be desirable in some packaging applications. The paper may be provided with coatings that will provide waterproofing to the paper as the photographic element of the invention must be processed in aqueous chemistry to develop the silver halide image. An example of a suitable coating is acrylic or polyethylene polymer.

Polymer substrates are another preferred pragmatic sheet material because they are tear resistant, have excellent conformability, good chemical resistance and high in strength. Preferred polymer substrates include polyester, oriented polyolefin such as polyethylene and polypropylene, cast polyolefins such as polypropylene and polyethylene, polystyrene, acetate and vinyl. Polymers are preferred as they are strong and flexible and provide an excellent surface for the coating of silver halide imaging layers.

Biaxially oriented polyolefin sheets are preferred for the pragmatic sheet as they are low in cost, have excellent optical properties that optimize the silver halide system, and can be applied to packages in high speed labeling equipment. Microvoided composite biaxially oriented sheets are most preferred because the voided layer provides opacity and lightness without the need for $TiO_2$. Also, the voided layers of the microvoided biaxially oriented sheets have been shown to significantly reduce pressure sensitivity of the silver halide imaging layers. Microvoided biaxially oriented sheets are conveniently manufactured by coextrusion of the core and surface layers, followed by biaxial orientation, whereby voids are formed around void-initiating material contained in the core layer. Such composite sheets are disclosed in U.S. Pat. Nos. 4,377,616; 4,758,462; 4,632,869; and 5,866,282. The biaxially oriented polyolefin sheets also may be laminated to one or both sides of a paper sheet to form the pragmatic sheet of a label with greater stiffness if that is needed.

The flexible polymer pragmatic sheet substrate may contain more than one layer. The skin layers of the flexible substrate can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core.

Voided biaxially oriented polyolefin sheets are a preferred flexible pragmatic sheet substrate for the coating of light sensitive silver halide imaging layers. Voided films are preferred as they provide opacity, whiteness and image sharpness to the image. "Void" is used herein to mean devoid of added solid and liquid matter, although it is likely the "voids" contain gas. The void-initiating particles which remain in the finished packaging sheet core should be from 0.1 to 10 µm in diameter and preferably round in shape to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The photographic element of this invention generally has a glossy surface, that is, a surface that is sufficiently smooth to provide excellent reflection properties. An opalescent surface may be preferred because it provides a unique photographic appearance to a label that is perceptually preferred by consumers. The opalescent surface is achieved when the microvoids in the vertical direction are between 1 and 3 µm. By the vertical direction, it is meant the direction that is perpendicular to the plane of the imaging member. The thickness of the microvoids preferably is between 0.7 and 1.5 µm for best physical performance and opalescent properties. The preferred number of microvoids in the vertical direction is between 8 and 30. Less than 6 microvoids in the vertical direction do not create the desired opalescent surface. Greater than 35 microvoids in the vertical direction do not significantly improve the optical appearance of the opalescent surface.

The void-initiating material for the flexible pragmatic sheet substrate may be selected from a variety of materials and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=CH$_2$, wherein Ar represents an aromatic hydrocarbon radical, or an aromatic halohydrocarbon radical of the benzene series and R is hydrogen or the methyl radical; acrylate-type monomers include monomers of the formula CH$_2$=C(R')—C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula CH$_2$=CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series HO(CH$_2$)$_n$OH wherein n is a whole number within the range of 2–10 and having reactive olefinic linkages within the polymer molecule, the above-described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof.

Examples of typical monomers for making the cross-linked polymer void initiating particles include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethylpropane sulfonic acid, vinyl toluene, etc. Preferably, the cross-linked polymer is polystyrene or poly(methyl methacrylate). Most preferably, it is polystyrene, and the cross-linking agent is divinylbenzene.

Processes well known in the art yield nonuniformly sized void initiating particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads or inorganic particles such as clay, talc, barium sulfate, or calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin sheet is utilized.

The total thickness of the topmost skin layer of a preferred polymeric pragmatic sheet substrate may be between 0.20 µm and 1.5 µm, preferably between 0.5 and 1.0 µm. Below 0.5 µm any inherent nonplanarity in the coextruded skin layer may result in unacceptable color variation. At skin thickness greater than 1.0 µm, there is a reduction in the photographic optical properties such as image resolution. At thickness greater than 1.0 µm, there is also a greater material volume to filter for contamination such as clumps or poor color pigment dispersion.

Addenda may be added to the topmost skin layer of the flexible pragmatic sheet substrate to change the color of the imaging element. For labeling use, a white substrate with a slight bluish tinge is preferred. The addition of the slight bluish tinge may be accomplished by any process which is known in the art including the machine blending of color concentrate prior to extrusion and the melt extrusion of blue colorants that have been preblended at the desired blend ratio. Colored pigments that can resist extrusion temperatures greater than 320° C. are preferred, as temperatures greater than 320° C. are necessary for coextrusion of the skin layer. Blue colorants used in this invention may be any colorant that does not have an adverse impact on the imaging element. Preferred blue colorants include Phthalocyanine blue pigments, Cromophtal blue pigments, Irgazin blue pigments, and Irgalite organic blue pigments. Optical brightener may also be added to the skin layer to absorb UV energy and emit light largely in the blue region. $TiO_2$ may also be added to the skin layer. While the addition of $TiO_2$ in the thin skin layer of this invention does not significantly contribute to the optical performance of the sheet, it can cause numerous manufacturing problems such as extrusion die lines and spots. The skin layer substantially free of $TiO_2$ is preferred. $TiO_2$ added to a layer between 0.20 and 1.5 µm does not substantially improve the optical properties of the support, will add cost to the design, and will cause objectionable pigments lines in the extrusion process.

Addenda may be added to the core matrix and/or to one or more skin layers to improve the optical properties of the flexible substrate. Titanium dioxide is preferred and is used in this invention to improve image sharpness or MTF, opacity, and whiteness. The $TiO_2$ used may be either anatase or rutile type. Further, both anatase and rutile $TiO_2$ may be blended to improve both whiteness and sharpness. Examples of $TiO_2$ that are acceptable for a photographic system are DuPont Chemical Co. R101 rutile $TiO_2$ and DuPont Chemical Co. R104 rutile $TiO_2$. Other pigments known in the art to improve photographic optical responses may also be used in this invention. Examples of other pigments known in the art to improve whiteness are talc, kaolin, $CaCO_3$, $BaSO_4$, ZnO, $TiO_2$, ZnS, and $MgCO_3$. The preferred $TiO_2$ type is anatase, as anatase $TiO_2$ has been found to optimize image whiteness and sharpness with a voided layer.

Addenda may be added to the flexible pragmatic sheet substrate of this invention so that when the biaxially oriented sheet is viewed from a surface, the imaging element emits light in the visible spectrum when exposed to ultraviolet radiation. Emission of light in the visible spectrum allows for the support to have a desired background color in the presence of ultraviolet energy. This is particularly useful when images are viewed outside as sunlight contains ultraviolet energy and may be used to optimize image quality for consumer and commercial applications.

Addenda known in the art to emit visible light in the blue spectrum are preferred. Consumers generally prefer a slight blue tint to the density minimum areas of a developed image defined as a negative b* compared to a neutral density minimum defined as a b* within one b* unit of zero. b* is the measure of yellow/blue in CIE (Commission Internationale de L'Eclairage) space. A positive b* indicates yellow, while a negative b* indicates blue. The addition of addenda that emits in the blue spectrum allows for tinting the support without the addition of colorants which would decrease the whiteness of the image. The preferred emission is between 1 and 5 delta b* units. Delta b* is defined as the b* difference measured when a sample is illuminated with a ultraviolet light source and a light source without any significant ultraviolet energy. Delta b* is the preferred measure to determine the net effect of adding an optical brightener to the top biaxially oriented sheet of this invention. Emissions less than 1 b* unit cannot be noticed by most customers; therefore, is it not cost effective to add optical brightener to the biaxially oriented sheet when the b* is changed by less than 1 b* unit. An emission greater that 5 b* units would interfere with the color balance of the images making the whites appear too blue for most consumers.

The preferred addenda is an optical brightener. An optical brightener is a colorless, fluorescent, organic compound that absorbs ultraviolet light and emits it as visible blue light. Examples include, but are not limited to, derivatives of 4,4'-diaminostilbene-2,2'-disulfonic acid, coumarin derivatives such as 4-methyl-7-diethylaminocoumarin, 1–4-Bis (O-Cyanostyryl) Benzol and 2-Amino-4-Methyl Phenol.

The voids provide added opacity to the flexible substrate. This voided layer can also be used in conjunction with a layer that contains at least one pigment from the group consisting of $TiO_2$, $CaCO_3$, clay, $BaSO_4$, ZnS, $MgCO_3$, talc, kaolin, or other materials that provide a highly reflective white layer in said film of more than one layer. The combination of a pigmented layer with a voided layer provides advantages in the optical performance of the final image.

Voided layers of the flexible pragmatic sheet substrate are more susceptible than solid layers to mechanical failure, such as cracking or delamination from adjacent layers. Voided structures that contain $TiO_2$, or are in proximity to layers containing $TiO_2$, are particularly susceptible to loss of mechanical properties and mechanical failure with long-term exposure to light. $TiO_2$ particles initiate and accelerate the photooxidative degradation of polypropylene. The addition of a hindered amine stabilizer to at least one later of a multilayer biaxially oriented film and in the preferred embodiment in the layer containing $TiO_2$ and, furthermore, in the most preferred embodiment in the hindered amine is in the layer with $TiO_2$, as well as in the adjacent layers. improvements to both light and dark keeping image stability are achieved.

The polymer pragmatic sheet substrate preferably contains a stabilizing amount of hindered amine at or about 0.01 to 5% by weight in at least one layer of said film. While these levels provide improved stability to the biaxially oriented film, the preferred amount at or about 0.1 to 3% by weight provides an excellent balance between improved stability for both light and dark keeping, while making the structure more cost effective.

The flexible biaxially pragmatic sheet substrate of this invention which has a microvoided core is preferred. The microvoided core adds opacity and whiteness to the imaging support, further improving imaging quality. Combining the image quality advantages of a microvoided core with a material, which absorbs ultraviolet energy and emits light in the visible spectrum, allows for the unique optimization of image quality, as the image support can have a tint when exposed to ultraviolet energy yet retain excellent whiteness when the image is viewed using lighting that does not contain significant amounts of ultraviolet energy such as indoor lighting.

It has been found that the microvoids located in the voided layer of the flexible biaxially oriented substrate provide a reduction in undesirable pressure fog. Mechanical pressure, of the order of hundreds of kilograms per square centimeter, causes an undesirable, reversible decrease in sensitivity by a mechanism at the time of writing that is not fully understood. The net result of mechanical pressure is an unwanted increase in density, mainly yellow density. The voided layer in the biaxially oriented flexible substrate absorbs mechanical pressure by compression of the voided layer, common in the converting and photographic processing steps, and reduces the amount of yellow density change. Pressure sensitivity is measured by applying a 206 MPa load to the coated light sensitive silver halide emulsion, developing the yellow layer, and measuring the density difference with an X-Rite model 310 (or comparable) photographic transmission densitometer between the control sample which was unloaded and the loaded sample. The preferred change in yellow layer density is less than 0.02 at a pressure of 206 MPa. A 0.04 change in yellow density is perceptually significant and, thus, undesirable.

The coextrusion, quenching, orienting, and heat setting of the flexible pragmatic sheet substrate may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature and below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers, while restraining to some degree the sheet against retraction in both directions of stretching. By having at least one non-voided skin on the microvoided core, the tensile strength of the flexible pragmatic sheet substrate is increased and makes the sheet more manufacturable. The higher tensile strength also allows the sheets to be made at wider widths and higher draw ratios than when sheets are made with all layers voided. Coextruding the layers further simplifies the manufacturing process.

Used herein, the phrase 'imaging element' comprises an imaging support as described above along with an image receiving layer as applicable to multiple techniques governing the transfer of an image onto the imaging element. Such techniques include thermal dye transfer, electrophotographic printing, or ink jet printing, as well as a support for photographic silver halide images. As used herein, the phrase "photographic element" is a material that utilizes photosensitive silver halide in the formation of images. While this invention is directed towards a photographic recording element comprising a support and at least one light sensitive silver halide emulsion layer comprising silver halide grains images that are formed utilizing ink jet printing, thermal dye transfer printing and electrophotographic printing are also valuable. In particular, the above mentioned printing technologies do not require a separate printing and chemical development process and are capable of printing images from a digital file which allows digital printing of packaging pressure sensitive labels.

The thermal dye image-receiving layer of the receiving elements of the invention may comprise, for example, a polycarbonate, a polyurethane, a polyester, polyvinyl chloride, poly(styrene-co-acrylonitrile), poly(caprolactone), or mixtures thereof. The dye image-receiving layer may be present in any amount that is effective for the intended purpose. In general, good results have been obtained at a concentration of from about 1 to about 10 g/m$^2$. An overcoat layer may be further coated over the dye-receiving layer, such as described in U.S. Pat. No. 4,775,657 of Harrison et al.

Dye-donor elements that are used with the dye-receiving element of the invention conventionally comprise a support having thereon a dye containing layer. Any dye can be used in the dye-donor employed in the invention, provided it is transferable to the dye-receiving layer by the action of heat. Especially good results have been obtained with sublimable dyes. Dye donors applicable for use in the present invention are described, e.g., in U.S. Pat. Nos. 4,916,112; 4,927,803; and 5,023,228. As noted above, dye-donor elements are used to form a dye transfer image. Such a process comprises image-wise-heating a dye-donor element and transferring a dye image to a dye-receiving element as described above to form the dye transfer image. In a preferred embodiment of the thermal dye transfer method of printing, a dye donor element is employed which compromises a poly(ethylene terephthalate) support coated with sequential repeating areas of cyan, magenta, and yellow dye, and the dye transfer steps are sequentially performed for each color to obtain a three-color dye transfer image. When the process is only performed for a single color, then a monochrome dye transfer image is obtained.

Thermal printing heads which can be used to transfer dye from dye-donor elements to receiving elements of the invention are available commercially. There can be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB No. 2,083,726A.

A thermal dye transfer assemblage of the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in the prior art. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, can be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In one form, the electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In an alternate electrographic process, electrostatic images are created ionographically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent, these toners form a film bonded to the paper. For heat-fusible toners, thermoplastic polymers are used as part of the particle. Heating both removes residual liquid and fixes the toner to paper.

When used as inkjet imaging media, the recording elements or media typically comprise a substrate or a support material having on at least one surface thereof an ink-receiving or image-forming layer. If desired, in order to improve the adhesion of the ink receiving layer to the support, the surface of the support may be corona-discharge-treated prior to applying the solvent-absorbing layer to the support or, alternatively, an undercoating, such as a layer formed from a halogenated phenol or a partially hydrolyzed vinyl chloride-vinyl acetate copolymer, can be applied to the surface of the support. The ink receiving layer is preferably coated onto the support layer from water or water-alcohol solutions at a dry thickness ranging from 3 to 75 micrometers, preferably 8 to 50 micrometers.

Any known ink jet receiver layer can be used in combination with the external polyester-based barrier layer of the present invention. For example, the ink receiving layer may consist primarily of inorganic oxide particles such as silicas, modified silicas, clays, aluminas, fusible beads such as beads comprised of thermoplastic or thermosetting polymers, non-fusible organic beads, or hydrophilic polymers such as naturally-occurring hydrophilic colloids and gums such as gelatin, albumin, guar, xantham, acacia, chitosan, starches and their derivatives, and the like; derivatives of natural polymers such as functionalized proteins, functionalized gums and starches, and cellulose ethers and their derivatives; and synthetic polymers such as polyvinyloxazoline, polyvinylmethyloxazoline, polyoxides, polyethers, poly(ethylene imine), poly(acrylic acid), poly(methacrylic acid), n-vinyl amides including polyacrylamide and polyvinylpyrrolidone, and poly(vinyl alcohol), its derivatives and copolymers; and combinations of these materials. Hydrophilic polymers, inorganic oxide particles, and organic beads may be present in one or more layers on the substrate and in various combinations within a layer.

A porous structure may be introduced into ink receiving layers comprised of hydrophilic polymers by the addition of ceramic or hard polymeric particulates, by foaming or blowing during coating, or by inducing phase separation in the layer through introduction of non-solvent. In general, it is preferred for the base layer to be hydrophilic, but not porous. This is especially true for photographic quality prints, in which porosity may cause a loss in gloss. In particular, the ink receiving layer may consist of any hydrophilic polymer or combination of polymers with or without additives as is well known in the art.

If desired, the ink receiving layer can be overcoated with an ink-permeable, anti-tack protective layer such as, for example, a layer comprising a cellulose derivative or a cationically-modified cellulose derivative or mixtures thereof. An especially preferred overcoat is poly β-1,4-anhydro-glucose-g-oxyethylene-g-(2'-hydroxypropyl)-N,N-dimethyl-N-dodecylammonium chloride. The overcoat layer is non porous, but is ink permeable and serves to improve the optical density of the images printed on the element with water-based inks. The overcoat layer can also protect the ink receiving layer from abrasion, smudging, and water damage. In general, this overcoat layer may be present at a dry thickness of about 0.1 to about 5 μm, preferably about 0.25 to about 3 μm.

In practice, various additives may be employed in the ink receiving layer and overcoat. These additives include surface active agents such as surfactant(s) to improve coatability and to adjust the surface tension of the dried coating, acid or base to control the pH, antistatic agents, suspending agents, antioxidants, hardening agents to cross-link the coating, antioxidants, UV stabilizers, light stabilizers, and the like. In addition, a mordant may be added in small quantities (2%–10% by weight of the base layer) to improve waterfastness. Useful mordants are disclosed in U.S. Pat. No. 5,474,843.

The layers described above, including the ink receiving layer and the overcoat layer, may be coated by conventional coating means onto a transparent or opaque support material commonly used in this art. Coating methods may include, but are not limited to, blade coating, wound wire rod coating, slot coating, slide hopper coating, gravure, curtain coating, and the like. Some of these methods allow for simultaneous coatings of both layers, which is preferred from a manufacturing economic perspective.

The DRL (dye receiving layer) is coated over the tie layer or TL at a thickness ranging from 0.1–10 μm, preferably 0.5–5 μm. There are many known formulations which may be useful as dye receiving layers. The primary requirement is that the DRL is compatible with the inks which it will be imaged so as to yield the desirable color gamut and density.

As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al in U.S. Pat. Nos. 4,879,166; 5,264,275; 5,104,730; 4,879,166, and Japanese Patents 1,095,091; 2,276,671; 2,276,670; 4,267,180; 5,024,335; and 5,016,517 disclose aqueous based DRL formulations comprising mixtures of psuedo-bohemite and certain water soluble resins. Light in U.S. Pat. Nos. 4,903,040; 4,930,041; 5,084,338; 5,126,194; 5,126,195; and 5,147,717 discloses aqueous-based DRL formulations comprising mixtures of vinyl pyrrolidone polymers and certain water-dispersible and/or water-soluble polyesters, along with other polymers and addenda. Butters et al in U.S. Pat. Nos. 4,857,386 and 5,102,717 disclose ink-absorbent resin layers comprising mixtures of vinyl pyrrolidone polymers and acrylic or methacrylic polymers. Sato et al in U.S. Pat. No. 5,194,317 and Higuma et al in U.S. Pat. No. 5,059,983 disclose aqueous-coatable DRL formulations based on poly(vinyl alcohol). Iqbal in U.S. Pat. No. 5,208,092 discloses water-based IRL formulations comprising vinyl copolymers which are subsequently cross-linked. In addition to these examples, there may be other known or contemplated DRL formulations which are consistent with the aforementioned primary and secondary requirements of the DRL, all of which fall under the spirit and scope of the current invention.

The preferred DRL is 0.1–10 micrometers thick and is coated as an aqueous dispersion of 5 parts alumoxane and 5 parts poly(vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, light stabilizers, and the like.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118; 5,027,131; and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

The preferred photographic element of this invention is directed to a silver halide photographic element capable of excellent performance when exposed by either an electronic printing method or a conventional optical printing method. An electronic printing method comprises subjecting a radiation sensitive silver halide emulsion layer of a recording element to actinic radiation of at least $10^{-4}$ ergs/cm$^2$ for up to 100 μ seconds duration in a pixel-by-pixel mode wherein the silver halide emulsion layer is comprised of silver halide grains as described above. A conventional optical printing method comprises subjecting a radiation sensitive silver halide emulsion layer of a recording element to actinic radiation of at least $10^{-4}$ ergs/cm$^2$ for $10^{-3}$ to 300 seconds in an imagewise mode wherein the silver halide emulsion layer is comprised of silver halide grains as described above. This invention in a preferred embodiment utilizes a radiation-sensitive emulsion comprised of silver halide grains (a) containing greater than 50 mole percent chloride based on silver, (b) having greater than 50 percent of their surface area provided by {100} crystal faces, and (c) having a central portion accounting for from 95 to 99 percent of total silver and containing two dopants selected to satisfy each of the following class requirements: (i) a hexacoordination metal complex which satisfies the formula:

$$[ML_6]^n \qquad (I)$$

wherein n is zero, −1, −2, −3, or −4; M is a filled frontier orbital polyvalent metal ion, other than iridium; and L$_6$ represents bridging ligands which can be independently selected, provided that at least four of the ligands are anionic ligands, and at least one of the ligands is a cyano ligand or a ligand more electronegative than a cyano ligand; and (ii) an iridium coordination complex containing a thiazole or substituted thiazole ligand. Preferred photographic imaging layer structures are described in EP Publication 1 048 977. The photosensitive imaging layers described therein provide particularly desirable images on the base of this invention.

Laser scoring is accomplished by focusing a high power laser beam on to the surface of the pragmatic sheet to be scored. In this case, the web materials of the invention is preferably translated under a stationary focused laser beam. The depth of the laser score into the pragmatic sheet of the invention is critical to the performance of the scoring operation. Insufficient depth of laser score results in incomplete slitting and thus separation of the pragmatic sheet from the carrier sheet. A laser score than penetrates too far into the carrier sheet results in a loss of bending resistance as the carrier sheet is partially fractured. Depth of laser score is a function of the laser power density per unit area and the translation velocity of the focused spot in relation to the material. The translation of the material or translation of the focused spot can be described as laser energy density per unit area. Laser scoring can be accomplished with either a repetitively pulsed laser or a continuous wave (CW) laser. The pulse rate of the laser should be approximately 1 pulse per second to continuous. The laser optical power should be sufficient to ablate or vaporize the material to be scored when focused with a positive lens. The focal length of the lens preferably is in the range of 3 mm to 500 mm.

The wavelength of the laser should be of a wavelength that is absorptive to the pragmatic sheet being scored. The preferred wave length for the scoring of the pragmatic sheet of the invention is between 100 nm to 20,000 nm wavelength. The material should be translated at velocity in which sufficient laser energy to cause ablation is not exceeded. The translated velocity of the web material of the invention preferably is between 1.0 meters/min to 600 meters/min.

Figure 2:
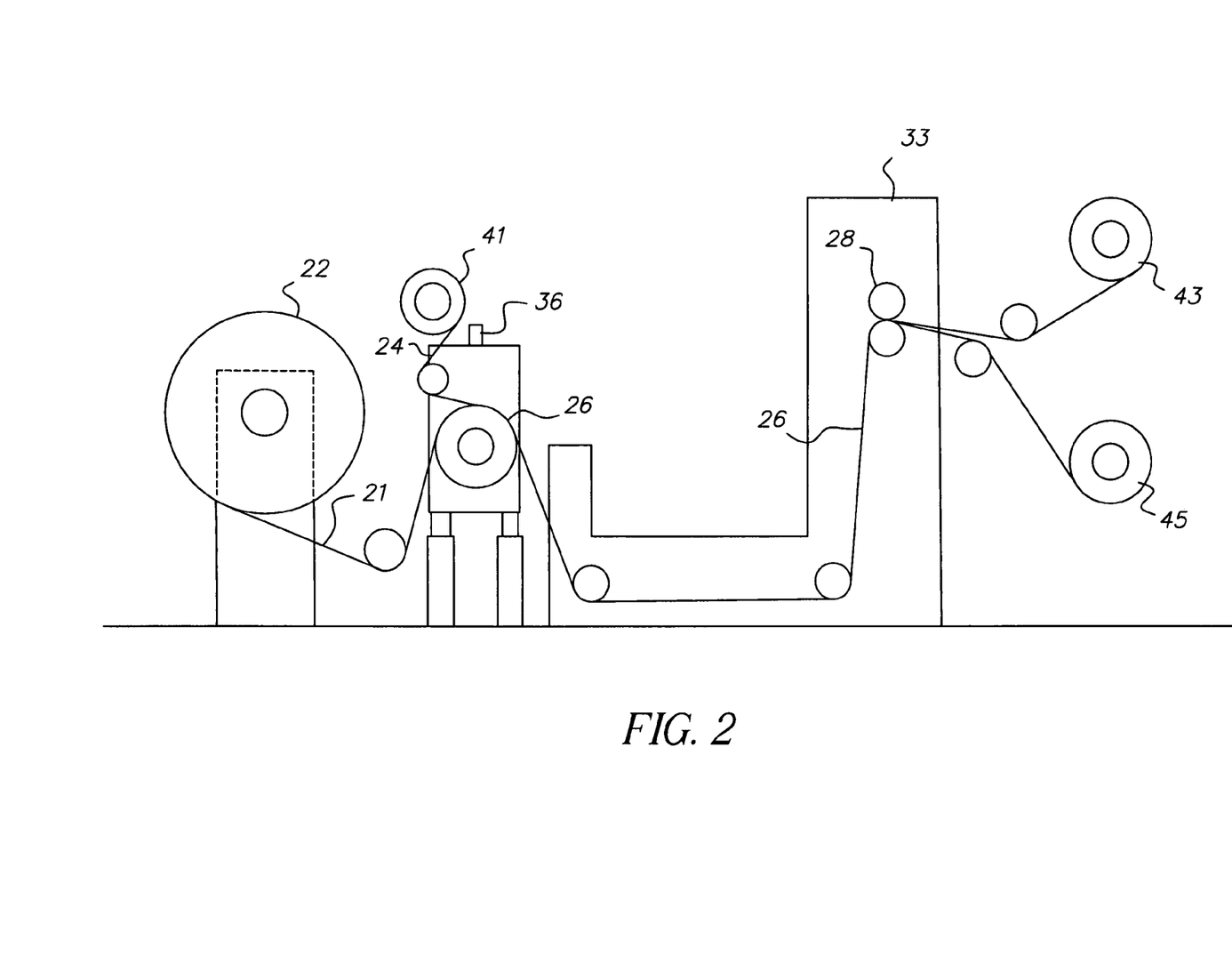
FIG. 2 is an illustration of the laser web slitting process to provide tack free continuous web materials.

FIG. 2 is an illustration of web slitting process to provide tack free web materials. Web material 21 comprising pragmatic sheet, image layer, carrier sheet and a pressure sensitive adhesive layer is unwound from a large, wide roll 22. The web material 21 is transported around sleeve 26 and the combined pragmatic sheet and adhesive layer 26 is slit with lasers 36. The edge removed slit pragmatic sheet and adhesive is wound on take up spool 41. The web material 21 is then transported to carrier sheet slitter section 33, were the carrier sheet is slit utilizing shear knives 28. Tack free rolls are wound in winders 43 and 45.

The following examples illustrate the practice of this invention. They are not intended to be exhaustive of all possible variations of the invention. Parts and percentages are by weight unless otherwise indicated.

EXAMPLES

Example 1

In this example a silver halide pressure sensitive packaging label was created by applying a light sensitive silver halide imaging layers to a pressure sensitive label stock. The label stock consisted of a flexible white biaxially oriented polypropylene face stock backside coated with a pressure sensitive adhesive that was adhesive laminated to a coated paper liner. The light sensitive silver halide imaging layers were a yellow, magenta, and cyan coupler system capable of accurate reproduction of flesh tone. After applying the light sensitive silver halide imaging layers, the invention materials were laser slit into continuous rolls where the pragmatic sheet was narrower than the carrier sheet thus providing an adhesive tack free edge. After slitting, the converted rolls were transported in a digital photographic printer that utilized edge guiding equipment to transport of a tack free slit edge compared to a conventionally slit web were the pragmatic sheet is the same width as the carrier sheet.

The web material of the example was produced by pressure sensitive laminating a biaxially oriented pragmatic sheet to a silicone coated carrier sheet.

Biaxially Oriented Polyolefin Pragmatic Sheet:

A composite sheet polyolefin sheet (70 μm thick) (d=0.68 g/cc) consisting of a microvoided and oriented polypropylene core (approximately 60% of the total sheet thickness), with a homopolymer non-microvoided oriented polypropylene layer on each side of the voided layer; the void initiating material used was poly(butylene terephthalate). The polyolefin sheet had a skin layer consisting of polyethylene and a blue pigment. The polypropylene layer adjacent the voided layer contained 8% rutile $TiO_2$. The silver halide imaging layers were applied to the blue tinted polyethylene skin layer.

Pressure Sensitive Adhesive:

Permanent solvent based acrylic adhesive 12 μm thick

Carrier Sheet:

A carrier sheet that consisted of a cellulose paper core (80 micrometers thick) on to which a biaxially oriented sheet of polypropylene was extrusion laminated to the backside utilizing LDPE resin. The backside oriented polypropylene contained a roughness layer to allow for efficient transport in photographic printing equipment. The roughness layer consisted of a mixture of polyethylene and polypropylene immiscible polymers. The topside of the carrier sheet was extrusion coated with LDPE for a silicone hold out. The cellulose paper contained 8% moisture and 1% salt for conductivity. The total thickness of the laminated carrier sheet was 128 micrometers, and the stiffness was 80 millinewtons in both the machine and cross directions. The paper carrier sheet was coated with a silicone release coat adjacent to the extruded LDPE layer.

Structure of the web material used in this example was as follows:

Voided polypropylene sheet (pragmatic sheet)
Acrylic pressure sensitive adhesive
Silicone coating
Carrier sheet Preferred photographic imaging layer structures are described in EP Publication 1 048 977. Silver chloride emulsions were chemically and spectrally sensitized as described below. A biocide comprising a mixture of N-methyl-isothiazolone and N-methyl-5-chloro-isthiazolone was added after sensitization.

Blue Sensitive Emulsion (Blue EM-1). A high chloride silver halide emulsion is precipitated by adding approximately equimolar silver nitrate and sodium chloride solutions into a well-stirred reactor containing glutaryldiaminophenyldisulfide, gelatin peptizer, and thioether ripener. Cesium pentachloronitrosylosmate(II) dopant is added during the silver halide grain formation for most of the precipitation, followed by the addition of potassium hexacyanoruthenate(II), potassium (5-methyl-thiazole)-pentachloroiridate, a small amount of KI solution, and shelling without any dopant. The resultant emulsion contains cubic-shaped grains having edge length of 0.6 μm. The emulsion is optimally sensitized by the addition of a colloidal suspension of aurous sulfide and heat ramped to 60° C., during which time blue sensitizing dye BSD-4, potassium hexchloroiridate, Lippmann bromide, and 1-(3-acetamidophenyl)-5-mercaptotetrazole were added.

Green Sensitive Emulsion (Green EM-1): A high chloride silver halide emulsion is precipitated by adding approximately equimolar silver nitrate and sodium chloride solutions into a well-stirred reactor containing gelatin peptizer and thioether ripener. Cesium pentachloronitrosylosmate(II) dopant is added during the silver halide grain formation for most of the precipitation, followed by the addition of potassium (5-methylthiazole)-pentachloroiridate. The resultant emulsion contains cubic-shaped grains of 0.3 μm in edge length size. The emulsion is optimally sensitized by the addition of glutaryldiaminophenyldisulfide, a colloidal suspension of aurous sulfide and heat ramped to 55° C., during which time potassium hexachloroiridate doped Lippmann bromide, a liquid crystalline suspension of green sensitizing dye GSD-1, and 1-(3-acetamidophenyl)-5-mercaptotetrazole were added.

Red Sensitive Emulsion (Red EM-1): A high chloride silver halide emulsion is precipitated by adding approximately equimolar silver nitrate and sodium chloride solutions into a well-stirred reactor containing gelatin peptizer and thioether ripener. During the silver halide grain formation, potassium hexacyanoruthenate(II) and potassium (5-methylthiazole)-pentachloroiridate are added. The resultant emulsion contains cubic shaped grains of 0.4 μm in edge length size. The emulsion is optimally sensitized by the addition of glutaryldiaminophenyldisulfide, sodium thiosulfate, tripotassium bis{2-[3-(2-sulfobenzamido)phenyl]-mercaptotetrazole} gold(I) and heat ramped to 64° C., during which time 1-(3-acetamidophenyl)-5-mercaptotetrazole, potassium hexachloroiridate, and potassium bromide are added. The emulsion is then cooled to 40° C., pH adjusted to 6.0, and red sensitizing dye RSD-1 is added.

Coupler dispersions were emulsified by methods well known to the art, and the following layers were coated on the above pragmatic layer support.

The following flesh tone optimized light sensitive silver halide imaging layers were utilized to prepare photographic label utilizing the invention label base material. The following imaging layers were coated utilizing curtain coating:

| Layer | Item | Laydown (g/m²) |
|---|---|---|
| Layer 1 | Blue Sensitive Layer | |
| | Gelatin | 1.3127 |
| | Blue sensitive silver (Blue EM-1) | 0.2399 |
| | Y-4 | 0.4143 |
| | ST-23 | 0.4842 |
| | Tributyl Citrate | 0.2179 |
| | ST-24 | 0.1211 |
| | ST-16 | 0.0095 |
| | Sodium Phenylmercaptotetrazole | 0.0001 |
| | Piperidino hexose reductone | 0.0024 |
| | 5-chloro-2-methyl-4-isothiazolin-3-one/2-methyl-4-isothiazolin-3-one(3/1) | 0.0002 |
| | SF-1 | 0.0366 |
| | Potassium chloride | 0.0204 |
| | Dye-1 | 0.0148 |
| Layer 2 | Interlayer | |
| | Gelatin | 0.7532 |
| | ST-4 | 0.1076 |
| | S-3 | 0.1969 |
| | 5-chloro-2-methyl-4-isothiazolin-3-one/2-methyl-4-isothiazolin-3-one(3/1) | 0.0001 |
| | Catechol disulfonate | 0.0323 |
| | SF-1 | 0.0081 |
| Layer 3 | Green Sensitive Layer | |
| | Gelatin | 1.1944 |
| | Green Sensitive Silver (Green EM-1) | 0.1011 |
| | M-4 | 0.2077 |
| | Oleyl Alcohol | 0.2174 |
| | S-3 | 0.1119 |
| | ST-21 | 0.0398 |
| | ST-22 | 0.2841 |
| | Dye-2 | 0.0073 |
| | 5-chloro-2-methyl-4-isothiazolin-3-one/2-methyl-4-isothiazolin-3-one(3/1) | 0.0001 |
| | SF-1 | 0.0236 |
| | Potassium chloride | 0.0204 |
| | Sodium Phenylmercaptotetrazole | 0.0007 |
| Layer 4 | M/C Interlayer | |
| | Gelatin | 0.7532 |
| | ST-4 | 0.1076 |
| | S-3 | 0.1969 |
| | Acrylamide/t-Butylacrylamide sulfonate copolymer | 0.0541 |
| | Bis-vinylsulfonylmethane | 0.1390 |
| | 3,5-Dinitrobenzoic acid | 0.0001 |
| | Citric acid | 0.0007 |
| | Catechol disulfonate | 0.0323 |
| | 5-chloro-2-methyl-4-isothiazolin-3-one/2-methyl-4-isothiazolin-3-one(3/1) | 0.0001 |
| Layer 5 | Red Sensitive Layer | |
| | Gelatin | 1.3558 |
| | Red Sensitive silver (Red EM-1) | 0.1883 |
| | IC-35 | 0.2324 |
| | IC-36 | 0.0258 |
| | UV-2 | 0.3551 |
| | Dibutyl sebacate | 0.4358 |
| | S-6 | 0.1453 |
| | Dye-3 | 0.0229 |
| | Potassium p-toluenethiosulfonate | 0.0026 |
| | 5-chloro-2-methyl-4-isothiazolin-3-one/2-methyl-4-isothiazolin-3-one(3/1) | 0.0001 |
| | Sodium Phenylmercaptotetrazole | 0.0005 |
| | SF-1 | 0.0524 |

-continued

| Layer | Item | Laydown (g/m²) |
|---|---|---|
| Layer 6 | UV Overcoat | |
| | Gelatin | 0.8231 |
| | UV-1 | 0.0355 |
| | UV-2 | 0.2034 |
| | ST-4 | 0.0655 |
| | SF-1 | 0.0125 |
| | S-6 | 0.0797 |
| | 5-chloro-2-methyl-4-isothiazolin-3-one/2-methyl-4-isothiazolin-3-one(3/1) | 0.0001 |
| Layer 7 | SOC | |
| | Gelatin | 0.6456 |
| | Ludox AM ™ (colloidal silica) | 0.1614 |
| | Polydimethylsiloxane (DC200 ™) | 0.0202 |
| | 5-chloro-2-methyl-4-isothiazolin-3-one/2-methyl-4-isothiazolin-3-one(3/1) | 0.0001 |
| | SF-2 | 0.0032 |
| | Tergitol 15-S-5 ™ (surfactant) | 0.0020 |
| | SF-1 | 0.0081 |
| | Aerosol OT ™ (surfactant) | 0.0029 |

Laser Scoring of the Pragmatic Sheet of the Invention:

A $CO_2$ laser with a wavelength of 10,600 nm is focused with a 25 mm focal length lens. The following are were the laser scoring specifications.

1. 2–30 watt $CO_2$ lasers are focused in two lines orthogonal to the direction of web translation.
2. The spacing between the two scored lines were 1.75 mm.
3. Pulse width of laser: 50 microseconds
4. Focused Spot Size: 85 micrometers
5. Optical power density at the focused spot: 530 KW/cm2
6. Energy delivered at nominal 50 microsecond pulse width: 1.5 mJ
7. Energy density at the focused spot: 26 $J/cm^2$
8. Pulse repetition rate: 10,000 pps (pulses per second)
9. Web Velocity: 40 meters/min For this application, two focused laser beams were adjusted to score the face stock in two spots, 0.125" apart, and with sufficient power to penetrate the full thickness of the pragmatic sheet, but no further. During translation, when the material is unwound from a supply roll and rewound into a finished roll, two distinct scoring lines are formed under the lasers, which mark the boundaries of the scored strip to be removed. Each pair of beams creates a separate scored strip. With careful manipulation, the narrow scored strips are gripped and pulled upward 45–90 degrees to the material surface. These strips are fed to other rewind spindles for windup.

The scoring and stripping process removes the narrow strips. The material is designed in such a way that the adhesive remains attached to the face stock as it is removed and spooled. The zones where the strips are attached are clear of any face stock or adhesive. With the machine running, it is possible to continue on in this fashion until the supply roll is exhausted. The finished wound roll has the appearance of a smooth surface with strips of face stock removed.

The web material was slit using a typical shear knife to create the check material and slit using tack free edge slitting to create the invention material. The slitting process cuts the previously scored parent material into narrower slits that correspond to customer equipment and marketing needs. By the use of rotary slitter knives, the material is cut through completely down the center of the previously scored and stripped zone. The slitter knives need to be adequate enough to slit through the material with ease.

The 127 mm tack free slit rolls of light sensitive silver halide emulsion coated web material of this example were printed using a digital laser photographic printer run at 30 meters/min. The digital laser photographic printer contained 5 edge guiding devices internal to the printer. After each increment of web footage was conveyed through the printer, the web was stopped and visual observation were made as to the amount of acrylic pressure sensitive adhesive that was transferred to the machine guiding devices. A "heavy" amount and "medium" amount of transfer has been shown to cause transport difficulties in the printer and track off the edge guides onto the imaged surface. A "light" amount of adhesive is considered acceptable. The adhesive transfer for the invention material to the edge guides is contained in Table 2 below and the adhesive transfer to the edge guides for the control is contained in Table 3.

TABLE 2

| Length (meters) | Adhesive transfer at Guide 1 | Adhesive transfer at Guide 2 | Adhesive transfer at Guide 3 | Adhesive transfer at Guide 4 | Adhesive transfer at Guide 5 |
|---|---|---|---|---|---|
| 1,000 | None | None | None | None | None |
| 5,000 | None | None | None | None | None |
| 10,000 | None | None | None | None | None |

TABLE 3

| Length (meters) | Adhesive transfer at Guide 1 | Adhesive transfer at Guide 2 | Adhesive transfer at Guide 3 | Adhesive transfer at Guide 4 | Adhesive transfer at Guide 5 |
|---|---|---|---|---|---|
| 1,000 | Light | Light | Light | None | None |
| 5,000 | Medium | Medium | Light | Light | None |
| 10,000 | Heavy | Heavy | Heavy | Heavy | Medium |

From the data contained in Tables 2 and 3, the amount of adhesive transferred to the edge guides in the printer was significantly different between the invention slit edge and the control slit edge. By removing $\frac{1}{16}^{th}$ of an inch of the pragmatic sheet on each side of the invention, adhesive transfer to the edge guides was eliminated as 10,000 meters of web material were transported through the printer. Conversely, the control web material that was slit utilizing prior art shear slitting equipment had unacceptable transfer of adhesive with 5,000 meters of web. Further, by slitting the pragmatic sheet and the adhesive with a laser, the pressure sensitive adhesive was cauterized at the edges. A cauterized pressure sensitive adhesive has been shown to resist transfer to edge guiding equipment and front side/back side transfer to the top web when the web material is wound in a roll.

While this invention is directed towards a photographic recording element comprising a support and at least one light sensitive silver halide emulsion layer comprising silver halide grains images that is suitable for a pressure sensitive photographic label, the invention can be formed utilizing ink jet printing, thermal dye transfer printing and electrophotographic printing are also valuable. Prior art ink jet printing equipment, thermal dye transfer equipment and electrophotographic printing equipment contains edge guide devices that would be improved with a pressure sensitive web comprising a tack free edge as adhesive transfer is unacceptable in those precision printing processes. Further, by having the pragmatic sheet narrower than the carrier sheet, separation of the pragmatic sheet by the consumer is much less demanding than the case of the pragmatic sheet being the same width as the carrier sheet. Finally, while the invention is directed toward imaging elements containing a pressure sensitive adhesive, it has use in printed label stocks, adhesive tapes, double sided adhesive tapes, floor tiles, vinyl wall coverings or any other embodiment containing a pragmatic sheet, a pressure sensitive adhesive and a carrier sheet. For example, a tack free roll of adhesive tape could be shipped stacked on top of each other with the need for expensive silicone coated separation paper.

The invention has been described in detail with particular reference to certain preferred embodiments thereof, but it will be understood that variations and modifications can be effected within the spirit and scope of the invention.

What is claimed is:

1. A continuous roll of web material comprising a continuous carrier sheet, a continuous pragmatic sheet comprising at least one imaging layer and a continuous adhesive layer wherein said adhesive layer is between said carrier sheet and said pragmatic sheet, said adhesive layer more strongly adheres to said pragmatic sheet and said pragmatic sheet is narrower than said carrier sheet wherein the side of said carrier sheet in contact with said adhesive is reflective wherein the continuous adhesive exposed adjacent the edge of said pragmatic sheet is a cauterized adhesive, wherein said pragmatic sheet comprises at least one imaging layer, and wherein said continuous roll of web material is at least 10 meters in length, and a tack-free edge zone on at least one edge of said carrier sheet functions to prevent adhesive buildup in edge-guided printers wherein said carrier sheet has a thickness of between 75 and 225 µm.

2. The web material of claim 1 wherein said carrier sheet is between 0.6 and 10 mm wider on each side than said pragmatic sheet.

3. The web material of claim 2 wherein said pragmatic sheet is centered on said carrier sheet.

4. The web material of claim 1 wherein said pragmatic sheet is not centered on said carrier sheet.

5. The web material of claim 4 wherein said carrier sheet is between 0.6 and 10 mm wider on one side than said pragmatic sheet.

6. The web material of claim 1 wherein said pragmatic sheet has a thickness of between 40 and 75 µm.

7. The web material of claim 1 wherein said carrier sheet comprises cellulose fiber paper.

8. The carrier sheet of claim 7 wherein said paper has an edge penetration of less than 8 mm.

9. The web material of claim 1 wherein said carrier sheet has an optical transmission of less than 20 percent.

10. The web material of claim 1 wherein said carrier sheet has a tensile strength of greater than 120 MPa.

11. The web material of claim 1 wherein said carrier sheet has a resistivity of less than 1011 ohms/square.

12. The web material of claim 1 wherein said carrier sheet has a silicone coating on the side towards the adhesive.

13. The web material of claim 1 wherein said adhesive layer further comprises an antistat.

14. The web material of claim 1 wherein said adhesive layer is a solvent coated polymer.

15. The web material of claim 1 wherein said pragmatic layer comprises oriented polyolefin or oriented polyester polymer.

16. The web material of claim 1 wherein said pragmatic sheet comprises an oriented polymer having a voided layer and at least one layer comprising titanium dioxide between said voided layer and the surface layer.

17. The web material of claim 1 wherein said carrier sheet comprises a cellulose fiber paper and a biaxially oriented polymer sheet.

18. The web material of claim 17 wherein said biaxially oriented polymer sheet is below said paper.

19. The web material of claim 17 wherein said at least one layer comprising titanium dioxide contains at least 4% by weight of titanium dioxide.

20. The web material of claim 1 wherein said carrier sheet has a coefficient of friction between 0.20 and 0.60.

21. The web material of claim 1 wherein said carrier sheet comprises an oriented polymer having a voided layer.

22. The web material of claim 1 wherein said pragmatic sheet comprises cellulose paper.

23. The web material of claim 1 wherein said pragmatic sheet comprises polymer.

24. The web material of claim 1 wherein said imaging layer comprises silver halide.

25. The web material of claim 1 wherein said imaging layer comprises ink jet receiving layer.

26. The web material of claim 1 wherein said imaging layer comprises thermal dye receiving layer.

27. The web material of claim 1 wherein said imaging layer comprises electrophotographic receiving layer.

28. The web material of claim 1 wherein said imaging layer comprises pigment ink.

29. The web material of claim 1 wherein said carrier sheet in an area not covered by said pragmatic sheet is substantially adhesive free.

30. The web material of claim 1 wherein said carrier sheet has an L* of at least 91.0.

31. The web material of claim 1 wherein said carrier sheet contains white pigment.

32. The web material of claim 1 wherein said carrier sheet has a roughness average of less than 0.25 micrometers.

33. The web of claim 1 wherein said web is continuous in the machine direction.

* * * * *